G. LOFORESE.
AUTOMOBILE ATTACHMENT.
APPLICATION FILED MAR. 11, 1919.

1,315,138.

Patented Sept. 2, 1919.

Gaetano Loforese
Inventor.

UNITED STATES PATENT OFFICE.

GAETANO LOFORESE, OF GREENWICH, CONNECTICUT.

AUTOMOBILE ATTACHMENT.

1,315,138.  Specification of Letters Patent.  Patented Sept. 2, 1919.

Application filed March 11, 1919. Serial No. 282,029.

*To all whom it may concern:*

Be it known that I, GAETANO LOFORESE, a citizen of the United States, residing at 554 West Putnam avenue, in the town of Greenwich, county of Fairfield, and State of Connecticut, have invented a new and useful Automobile Attachment, of which the following is a specification.

My invention consists of an attachment for motor vehicles designed to be located at the front end of the frame of the usual types of cars, which attachment utilizes the power of the automobile itself to pull same out of ruts, ditches, mud, snow or other obstacles.

The object of my invention is to provide an attachment as above stated, set at the front end of the automobile frame or chassis, consisting of a worm shaft connected to the engine shaft and arranged for turning a gear wheel on another shaft set at right angles to said engine shaft and worm shaft, all properly supported and held in place and provided with a spool or drum and a rope or cable, the complete operation of which being under the control of the motor driver from the seat as hereinafter set forth and explained.

With other objects in view, that will hereinafter appear, my invention resides in an attachment of the character stated, that embodies the peculiar construction and novel arrangement of parts, all of which will be pointed out and described as per the accompanying drawings and set forth in the claims hereinafter made.

I attain these objects by the mechanism illustrated in the aforesaid drawings, in which—

Figure 1:
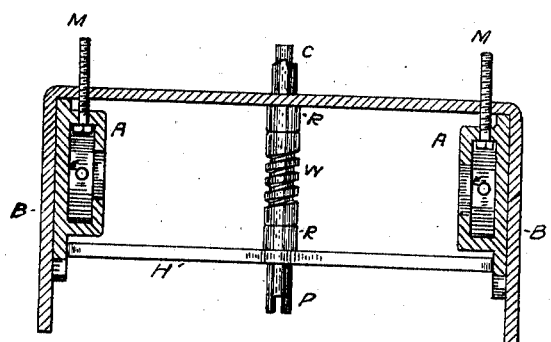
Figure 1 is a top view showing the position of the supporting plates and worm shaft on the chassis of car.
Figure 2:
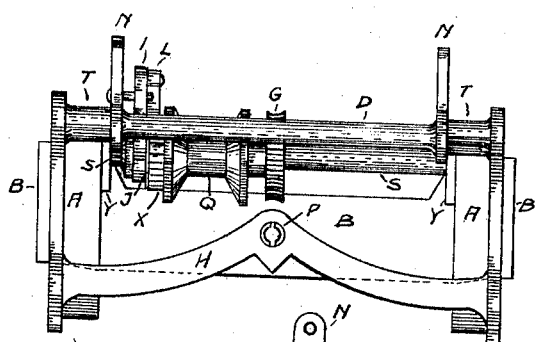
Fig. 2 is a front view and general drawing of the attachment.
Figure 3:
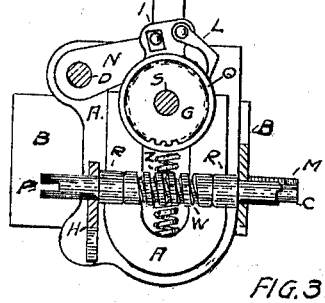
Fig. 3 is a sectional view showing the relative position of the worm and gear and spring.

When assembled, my attachment consists of support-plates A—A, bolted to the forward end of the chassis of the car at B—B, one on each side thereof, and designed to support the entire mechanism of the invention. Each supporting plate has a groove fitted with a pin E—E which serves to hold in place in each of said grooves a spring Z—Z, the function of which springs will be set forth in full hereinafter. Into each groove sets a gear shaft slide Y—Y which rests upon said springs. A spool and gear shaft —S—, having mounted thereon the rope receiving spool or drum Q, the worm gear G and the ratchet gear X and all intended to turn with said shaft, extends from slide to slide Y—Y and has its ends fitted thereto in such manner as to be free to revolve and at the same time to move up and down with the action of the said slides Y—Y in the grooves aforesaid. This up and down action is brought about by the springs Z—Z which act to separate the gear shaft S from the power shaft according as the control plates N—N are pulled and so connecting the gear shaft S with the power shaft, or released and so disconnecting same.

A worm screw W is fastened to the power or crank shaft of the car at C and is held in proper place by two spacing washers R—R. The said worm is situated directly underneath the gear G so that it may be meshed with said gear G and is mounted on said power shaft or crank shaft of the car at its end C and the other end thereof supported by the bracket or cross piece H.

The support rod D—D carries the two parallel control plates N—N which control the raising and lowering of the spool and gear shaft S and in conjunction with the action of the springs Z—Z meshing or disengaging the gear G from the worm W on the crank or power shaft of the car. The ratchet L serves to keep the spool and gear shaft from slipping back at all times whether the same is connected or disengaged from the power shaft. It is held to the control plate N by means of a separate plate carrying it and bolted thereto and held in place by a bolt I, and allowing the ratchet a freedom of motion in unison with the upward and downward movements of the spool and gear shaft required by the control plates N—N. The washer J sets between the ratchet and the plate and keeps the ratchet from becoming too loose.

The spool or drum Q is arranged so that a rope or cable can be attached thereto and the other end of said rope or cable when used is to be fastened to a stake, tree, pole or other object suitable as an anchor therefor. The holes in the control plates serve to hold the ends of a wire cable attached thereto and extended so that the said control plates can be operated from the seat of the motor car on the same principles involved in applying the hand brake of the car. When the cable is pulled taut it causes the control plates to put the entire mechanism in gear and when released the action of the springs Z—Z raises the same out of gear.

Should the motor car become stalled or stuck because of mud or other cause and unable to proceed under its own power a rope is then fastened to the spool or drum and the other end thereof fastened to a tree, stake, pole or other means of anchoring same. The driver can then pull the cable fastened to the control plates N—N from his place in the car; this action throws the gear G in engagement with the worm W and the turning motion produced winds the rope upon the spool or drum Q and draws the car along. The ratchet L and the ratchet gear X is a novel feature of the invention in that it checks and holds the car at any point in the winding of the rope whether the mechanism is in gear or disengaged from the power shaft.

Having described my invention, what I claim and desire to secure by Letters Patent, is,—

1. In combination, a shaft adapted to be coupled to a power driven shaft of a motor vehicle carried at the forward end of the chassis, a worm upon said first named shaft, a traverse shaft arranged at right angles with said worm shaft, a gear wheel mounted upon said traverse shaft and arranged to mesh with the worm of said worm shaft, supporting plates at each end of the gear wheel shaft for supporting and securing same to the vehicle frame, a groove in each of said supporting plates, a sliding plate affixed to each end of said traverse shaft and free to move up and down in the grooves of the side supporting plates, a spring held in the groove of each side supporting plate and arranged for releasing the engagement of the worm gear wheel with the worm on the power shaft, a rope receiving spool mounted on said traverse shaft and a ratchet gear mounted on said traverse shaft.

2. In combination, a shaft adapted to be coupled to a power driven shaft of a motor vehicle carried at the forward end of the chassis, a worm upon said first named shaft, a traverse shaft arranged at right angles with said worm shaft, a gear wheel mounted upon said traverse shaft and arranged to mesh with the worm of said worm shaft, supporting plates at each end of the gear wheel shaft for supporting and securing same to the vehicle frame, a groove in each of said supporting plates, a sliding plate affixed to each end of said traverse shaft and free to move up and down in the grooves of the side supporting plates, a spring held in each groove of the side supporting plates and arranged for releasing the engagement of the worm gear wheel with the worm on the power shaft, a rope receiving spool mounted on said traverse shaft and a ratchet gear mounted on said traverse shaft and a pawl to prevent the reverse movement of the spool and gear wheel shaft, a cross rod and parallel control plates attached to said cross rod and adapted to throw the mechanism in gear.

GAETANO LOFORESE.

Copies of this patent may be obtained for five cents each, by addressing the "Commissioner of Patents, Washington, D. C."